UNITED STATES PATENT OFFICE.

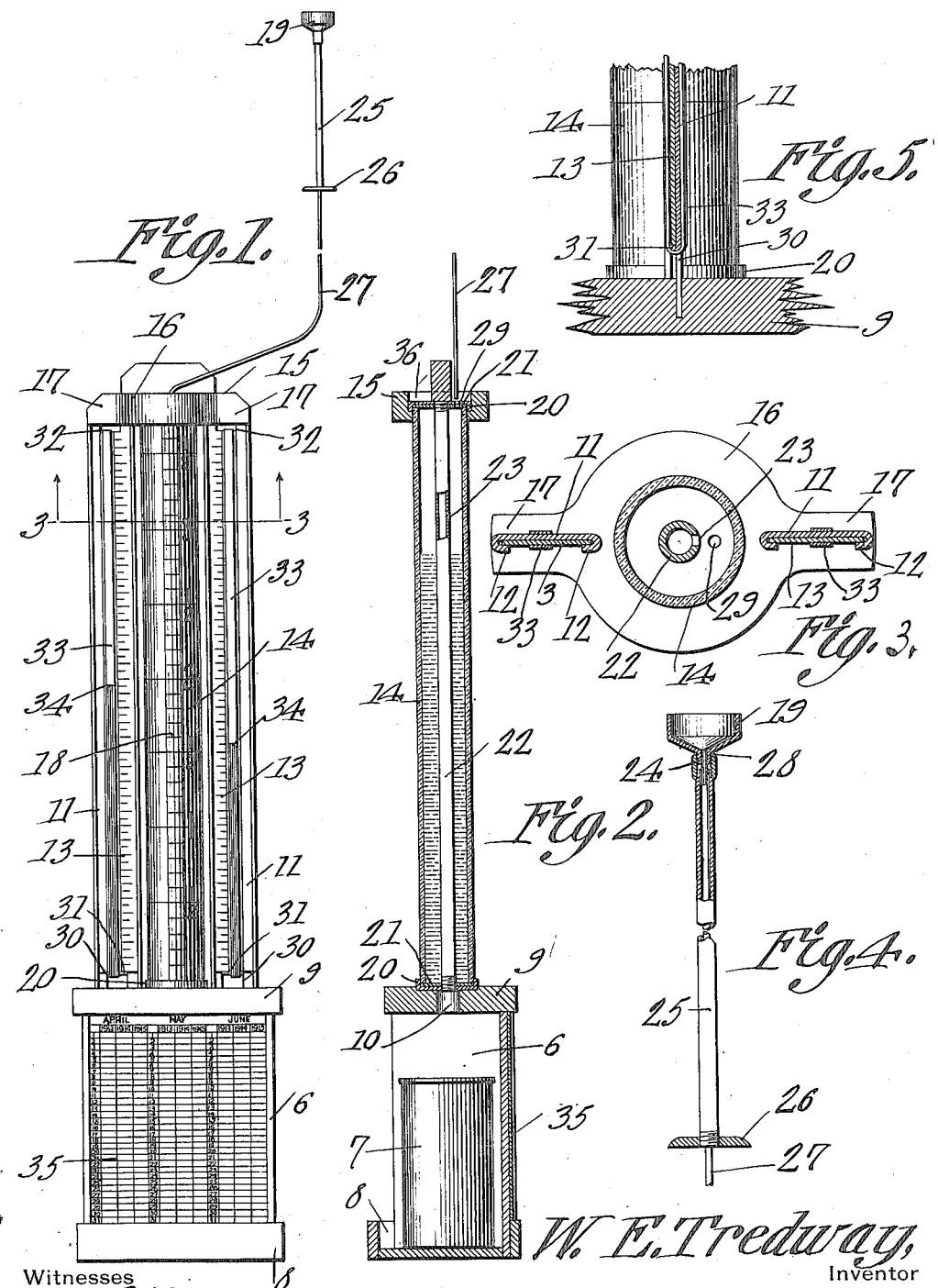
W. E. TREDWAY.
RAIN GAGE.
APPLICATION FILED SEPT. 15, 1914.
1,153,355.
Patented Sept. 14, 1915.
W. E. Tredway,
Inventor
Witnesses
by
Attorneys

WILLIAM E. TREDWAY, OF BLACKWELL, OKLAHOMA, ASSIGNOR TO WILLIAM R. FRETZ, AND GROVER W. COLLINSON, BOTH OF ARKANSAS CITY, KANSAS.

RAIN-GAGE.

1,153,355.   Specification of Letters Patent.   Patented Sept. 14, 1915.

Application filed September 15, 1914. Serial No. 861,886.

*To all whom it may concern:*

Be it known that I, WILLIAM E. TREDWAY, a citizen of the United States, residing at Blackwell, in the county of Kay and State of Oklahoma, have invented a new and useful Rain-Gage, of which the following is a specification.

This invention relates to improvements in rain gages.

An object of the present invention is to provide a rain gage which will indicate the amount of rainfall.

A further object is to provide a glass tube for the reception of the rain water therein and a collecting vessel of relatively larger diameter than the said tube so that the indications upon the tube will be greatly magnified in order to more accurately indicate the quantity of rain which has fallen.

A further object is to provide a vertically arranged glass tube in which the rain water is deposited and to provide upon each side of the said glass tube an indicating strip traveling over suitable scales upon which the total amount of rainfall is indicated for various periods of time so that they may be readily compared with the amount of rainfall as directly indicated by the water within the tube.

A further object is to provide a vertically disposed tube with a scale calibrated thereon so that the height of liquid may be read directly in inches of rainfall and to provide a tube within the said glass tube which extends through the end walls thereof and acts as an overflow pipe whereby the quantity of rainfall may be indicated even if it is more than the glass tube is able to hold.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated, in which:—

Figure 1 is a front view in elevation of the rain gage and with the collecting vessel in communication therewith. Fig. 2 is a longitudinal central view thereof. Fig. 3 is a cross sectional view taken on the line 3—3 of Fig. 1. Fig. 4 is a detail view of the collecting receptacle and its supporting standard, portions thereof being broken away. Fig. 5 is a fragmental view of a portion of the supporting base and one of the scale carrying standards.

Referring to the drawings in which similar reference numerals designate corresponding parts throughout the several figures, a housing or stand 6 is provided and which as illustrated in Fig. 2, houses the receptacle or vessel 7 therein. The rear portion of the stand or housing is open so that the vessel 7 may be easily positioned therein or removed therefrom. The lower base of the stand is in the form of a tray 8 to prevent the accidental displacement of the vessel. The upper base 9 is provided with the opening 10 extending therethrough and through which the overflow from the indicating tube passes down into the vessel 7. Positioned upon and rigidly secured to the upper base 9 are the metal standards 11 which, as illustrated in Fig. 3, are provided with the crimped or lapped side edges 12 which hold the graduated scales 13 thereto. There are two of the said metal standards and are spaced upon opposite sides of the indicating tube 14. Extending over top of the standards and tube and resting thereupon is the cap 15 which is circular throughout its central portion as at 16 and from which project the arms 17 which latter contact with and rest upon the metallic standards 11.

The indicating tube 14 is formed of some transparent or translucent material such as glass so that the height of the liquid within the tube may be easily determined.

A scale 18 is graduated directly upon the indicating tube and is plotted as a function of the relation between the diameters of the tube 14 and the collecting receptacle 19. The units chosen may be of any standard or arbitrary scale and in the present instance represent inches. A metal cap 20 with a rubber gasket 21 is positioned at the bottom of the tube 14 and a similar cap and gasket are positioned at the top of the tube. In order to hold the caps in place to insure that they will effect a liquid seal joint with the edges thereof, a pipe 22 is provided extending axially through the tube 14 and threadedly engaging the said caps. The tube 22 also acts in the capacity of an overflow pipe and for this reason is provided with the opening 23 extending in through the side walls thereof and which corresponds to the upper limit of the graduations upon the tube. Thus when the rain water within the tube reaches the height of the opening 23 it flows down through the tube through the opening 10 of the upper base and into the receptacle or vessel 7.

The collecting receptacle 19 is of definite cross sectional area and is positioned within some open space so that it may collect therein the rain water. The receptacle 19 is provided with the threaded projection 24 extending therefrom and which is engaged by the stand 25, the lower extremity of the latter of which has the flange 26 secured thereto. The flange 26 is adapted to be rigidly secured to some flat surface such as a roof and provides in connection with the stand pipe 25 a suitable support for the collecting receptacle. A pipe 27 extends through the stand pipe 25 and threadedly engages as at 28 the receptacle 19 and communicates therewith. The pipe 27 leads down to the upper cap 20 and which cap is provided with an opening 29 extending therethrough directly above which the pipe 27 terminates. Thus the rain water collected in the receiving or collecting receptacle passes down through the pipe 27 and through the opening 29 in the cap and into the indicating tube 14.

The standards 11 are slotted at their lower portions as at 30 the upper edge of the slot being curled upwardly as at 31 illustrated in Fig. 5, and which curled portion holds the scale 13 in proper vertical position. The standards are rabbeted into the upper base 9 and thus held rigidly thereto, it being understood however that some securing means other than the foregoing, may be employed if it be so desired. The upper extremity of each standard is also slotted as at 32 and extending around the standards and passing through the slots 30 and 32 are the ribbons 33. Each ribbon is formed of two colors the line of division being indicated at 34, it being noted that the colors selected are of pronouncedly different appearance so that the line of demarcation will be clear cut. The scales 13 are graduated in any suitable or convenient units and indicate the number of inches of rain which has fallen during a certain period of time. The ribbons are thus manually moved over the scales to the proper reading. The reading may be obtained by the summation of the figures which are entered upon the chart 35 which chart is positioned upon the housing or stand 6 and forms a convenient record for the tabulation of the quantities of rain fall.

In the practical use of the apparatus herein described, the collecting receptacle is placed in some exposed position so as to receive the rain therein. The rain water passes down through the pipe 27 and through the aperture 29 in the cap, into the indicating tube. The amount of rain fallen during a certain storm will be indicated between the differences in level before and after the same. This difference in level is to be noted upon the chart 35 day by day and the record kept. If at any time the quantity of rain fallen should exceed the capacity of the indicating tube, the rain water will pass into the overflow pipe 22 and down into the vessel 7. Should it be desired to ascertain the exact quantity of rain fallen even though it exceeds the capacity of the indicating tube it may be easily accomplished by removing the cap 15 which allows the entire indicating tube with its upper and lower caps to be removed from the supporting structure and the liquid may be emptied therefrom through the opening 29. The liquid within the vessel 7 may then be poured into the tube and the height it rises therein duly noted and the same added to the full scale reading of the indicating tube. It will be noted that as illustrated in Fig. 2, the cap 15 is provided with the opening 36 which contacts with the side wall of the indicating tube and fits beneath the upper cap thereof so that the tube will be locked upon the base by the standards 11. The removal of the upper or lower cap 20, allows the top cap 15 to be removed after which the indicating tube may be lifted from the supporting structure either for the purpose of cleaning or emptying rain water therefrom. The opening 29 in the cap is of restricted area so that the quantity of liquid lost by evaporation will be a negligible quantity. The scales upon each side of the indicating tube are principally for the purpose of indicating the amount of rain fallen during a certain period of time during the present and preceding days, months or years and afford a ready reference so that the amount of precipitation of rain over certain periods of time may be readily compared.

Having thus described my invention, what I claim as new is:—

1. An apparatus of the class described comprising a housing, an indicating tube mounted thereon, means for closing the ends thereof, there being an opening extending through the upper end of said tube, a rain water collecting receptacle communicating with the opening in said tube end, and an overflow pipe disposed within said tube.

2. In an apparatus of the class described, the combination of a closed tube, a rain water receiving receptacle in communication therewith, there being graduated upon the said tube, the said scale functional of the ratio of the cross sectional areas of said tube and said collecting receptacle, and an overflow pipe extending through said indicating tube and preventing the rise of liquid therein above a certain level.

3. In an apparatus of the class described, the combination of a rain water collecting receptacle, an indicating tube in communication therewith, means for determining the height of liquid within said tube, caps secured to the upper and lower extremities of said tube, and an overflow pipe extending through the said tube engaging the said caps and holding the said caps to the ends of said tube, said overflow pipe preventing the rise of liquid within said tube above a certain level.

4. In an apparatus of the class described, the combination of a supporting stand, a tube positioned thereon and extending thereabove, caps secured to the ends of said tube, an overflow pipe extending through said tube engaging said caps and holding the same rigidly in place, a vessel disposed within said stand in communication with said overflow pipe, standards rigidly secured to said base and positioned upon opposite sides of said tube, scales and indicating devices carried by said standards, an upper cap extending across said tube and standards and locking the said tube to said standards, and a rain water receiving receptacle in communication with the said tube.

In testimony that I claim the foregoing as my own, I have hereto affixed my signature in the presence of two witnesses.

WILLIAM E. TREDWAY.

Witnesses:
   E. F. HAINES,
   J. W. MORSE.